United States Patent
Schwab

Patent Number: 5,988,347
Date of Patent: Nov. 23, 1999

[54] COIN VALIDATOR FOR A PAYPHONE

[75] Inventor: David M. Schwab, Glenmore, Pa.

[73] Assignee: Mars, Incorporated, McLean, Va.

[21] Appl. No.: 08/996,972

[22] Filed: Dec. 23, 1997

[51] Int. Cl.[6] .................................................. G06F 7/00
[52] U.S. Cl. .................................................... 194/217
[58] Field of Search ............................................ 194/217

[56] References Cited

U.S. PATENT DOCUMENTS

| | | | |
|---|---|---|---|
| 4,763,769 | 8/1988 | Levasseur | 194/217 |
| 5,154,272 | 10/1992 | Nishiumi et al. | 194/217 |

*Primary Examiner*—F. J. Bartuska
*Assistant Examiner*—Bryan Jaketic
*Attorney, Agent, or Firm*—Fish & Richardson P.C.

[57] ABSTRACT

An electronic coin validator for connection to a payphone chassis that is capable of accepting coins of value greater than twenty-five cents is described. The coin validator includes a housing, a coin passageway, at least one coin sensor, a microprocessor and a memory. The microprocessor processes signals from the sensor to denominate and validate high value coins, accesses a high value coin credit signal packet corresponding to the denomination of the coin, and outputs the credit signal packet to the payphone chassis.

9 Claims, 7 Drawing Sheets

COIN VALIDATOR FOR A PAYPHONE

BACKGROUND OF THE INVENTION

The invention pertains to a coin validator unit for a payphone capable of discriminating coin denominations greater than twenty-five cents and providing appropriate signals to the payphone chassis.

In the United States, payphones utilize coin lines or business lines. Coin lines are used by most of the regional bell operating companies (RBOC's) and independent telephone company payphone service providers. Coin lines have tip, ring and ground lines, and utilize a Central Office to provide collect and refund signalling, to provide coin line supervision for such operations as call start and call end, and to determine remote rate determination for other than local calls.

Business lines are generally used by independent payphone provider companies (known as IPP companies). Business lines typically include standard, two-wire tip and ring lines, or normal telephone lines, and thus electronic payphone stations are required because no services are performed at a Central Office. Thus, each electronic payphone station utilized by the IPP company controls its own collect and refund operations, and sets its own call rates. The IPP company leases the business lines from a telephone company, and operates the payphone station business in a manner similar to that of vending machine operators.

Payphones connected to coin lines are commonly known as "Dumb" sets or "Smart" sets. A Dumb set has all telephone line functions performed at the Central Office, while a Smart set is characterized by an electronic chassis which performs some functions of the Dumb set as well as providing additional functions at the payphone station. An example of a Dumb set is a "32B" telephone in wide use in "Western-Electric Company"-style housings. Smart sets are typically designed to replace Dumb sets and contain circuitry to perform some or all of the Central Office functions in the payphone chassis. For example, the circuitry of a Smart set for use on a coin line may add such functions as audit and diagnostic capabilities at the payphone station.

When a call is initiated, a coin validator inside the payphone outputs signals to the payphone chassis as nickel, dime and quarter coins are accepted. In the case of a Smart set the signalling depends upon the chassis being used. The Smart set rates its own calls, so when business lines are being used, if the initial rate set in the chassis of the Smart set is met then the call is permitted to go through. In the case of a Smart or Dumb set connected to coin lines, the chassis generates coin signal pulses for the Central Office according to telephone company specifications.

The United States Mint plans to replace the Susan B. Anthony dollar coin with a new one-dollar denomination coin. The new U.S. dollar coin is slightly larger than the Washington-head quarter currently in circulation, and is made of a bi-metallic material, having an outside gold-color metal coating surrounding a core of another metal. It would be advantageous if payphones currently in use could accept the new dollar coins, particularly for long distance calls that typically cost several dollars. However, the existing payphone infrastructure for coin lines, which includes both the Dumb and Smart sets currently in use, does not include the capability to accept and process dollar coins.

SUMMARY OF THE INVENTION

In general, according to one aspect of the invention, an electronic coin validator for connection to a payphone chassis is disclosed that can accept coins of value greater than twenty-five cents. The coin validator includes a housing having a coin passageway and at least one coin sensor in the coin passageway. A control means is connected to the sensor and to a memory, and processes signals to validate and denominate coins. The control means accesses a credit signal packet from memory that corresponds to the denomination of the coin and outputs it to the payphone chassis.

Embodiments of the invention may include one of more of the following features. The coin validator may include a buffer to provide a delay between signals of the credit signal packet. Nickel, dime and quarter output signal lines may connect the control means to the payphone chassis. The coin passageway may have dimensions to permit coins having a diameter larger than a twenty-five cent coin to pass therethrough.

The invention also includes a technique for accepting coins in a payphone coin acceptor of denominations greater than twenty-five cents. The method includes authenticating the high-value coin, temporarily storing the value of the coin in memory, accessing a coin credit signal packet that corresponds to the value of the coin from the memory, and releasing the credit signal packet to the payphone chassis. The credit signal packet may contain a sequence of signals corresponding to a plurality of twenty-five cent coins, or to a plurality of ten-cent coins, or to a plurality of five-cent coins, or to a combination of five, ten and/or twenty-five cent coins. The method for releasing the credit signal packet; may include choosing at least one coin credit output line, determining the number of coin credit signals to transmit on a chosen line, and including a delay between each coin credit signal.

The present invention permits existing payphones to accept coins of value in excess of twenty-five cents, for example dollar coins, without requiring modifications to the payphone chassis or to the existing telephone infrastructure. As a result, independent payphone operators and telephone companies benefit from being able to offer the convenience to their customers of high-value coin acceptance without having to invest a large amount of money to replace their payphone equipment or upgrade the existing telephone Central Office coin signal processing equipment.

BRIEF DESCRIPTION OF THE DRAWINGS

Like reference numbers and designations in the various drawings indicate like elements.

DETAILED DESCRIPTION

Figure 1:
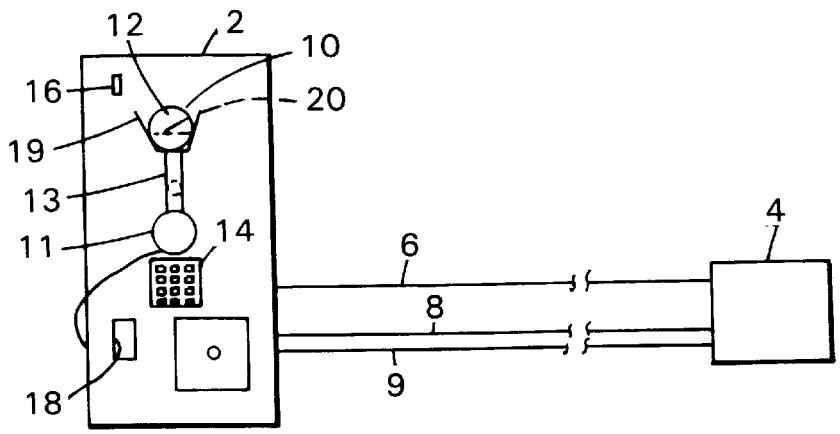
FIG. 1 illustrates a coin-operated telephone connected to a central office.

FIG. 1 shows a typical coin operated telephone or payphone 2 which is connected to a Central Office 4 by three wires, the phone lines, which are referred to as the tip 6, ring 8 and ground 9 lines. The payphone 2 includes a handset 10 having a mouthpiece 11 and an earpiece 12 which are connected by a handle 13, a keypad 14, a coin slot 16, and a coin return slot 18. When not in use by a customer, the handset 10 sits in a cradle 19 depressing a spring-loaded hook switch 20. When the handset 10 is in the position shown in FIG. 1, switch 20 is in its "on-hook" position. When handset 10 is lifted out of cradle 19, switch 20 is no longer depressed and it is then in its "off-hook" position.

In order to better understand the invention, a brief general description of how the payphone operates is set forth below. The Central Office 4 applies various D.C. voltage amplitudes and polarities on the tip 6 and ring 8 lines, from which the phone 2 generates its operational power when the handset 10 is off-hook. The varying DC voltages and an AC ringing voltage are interpreted by the coin telephone 2 as providing operational commands for controlling its operation. When handset 10 is on-hook, the phone 2 draws essentially no power from the tip 6 or ring 8 lines.

A customer picks up handset 10 to place a call thereby releasing the switch 20 from its depressed position. The phone 2 enters its off-hook state, and begins to draw power from the tip 6 and ring 8 lines to process the call. Next, the customer inserts a sufficient number of coins into the coin slot 16 to cover the cost of the call and the payphone transmits coin tone signals to the Central Office. The customer then dials the number using keypad 14, and the dialed number is transmitted to the Central Office 4 which connects the call. The customer completes the call by hanging up the phone, and then the money is collected by phone 2 when a collect signal from the Central Office 4 is received.

Figure 2:
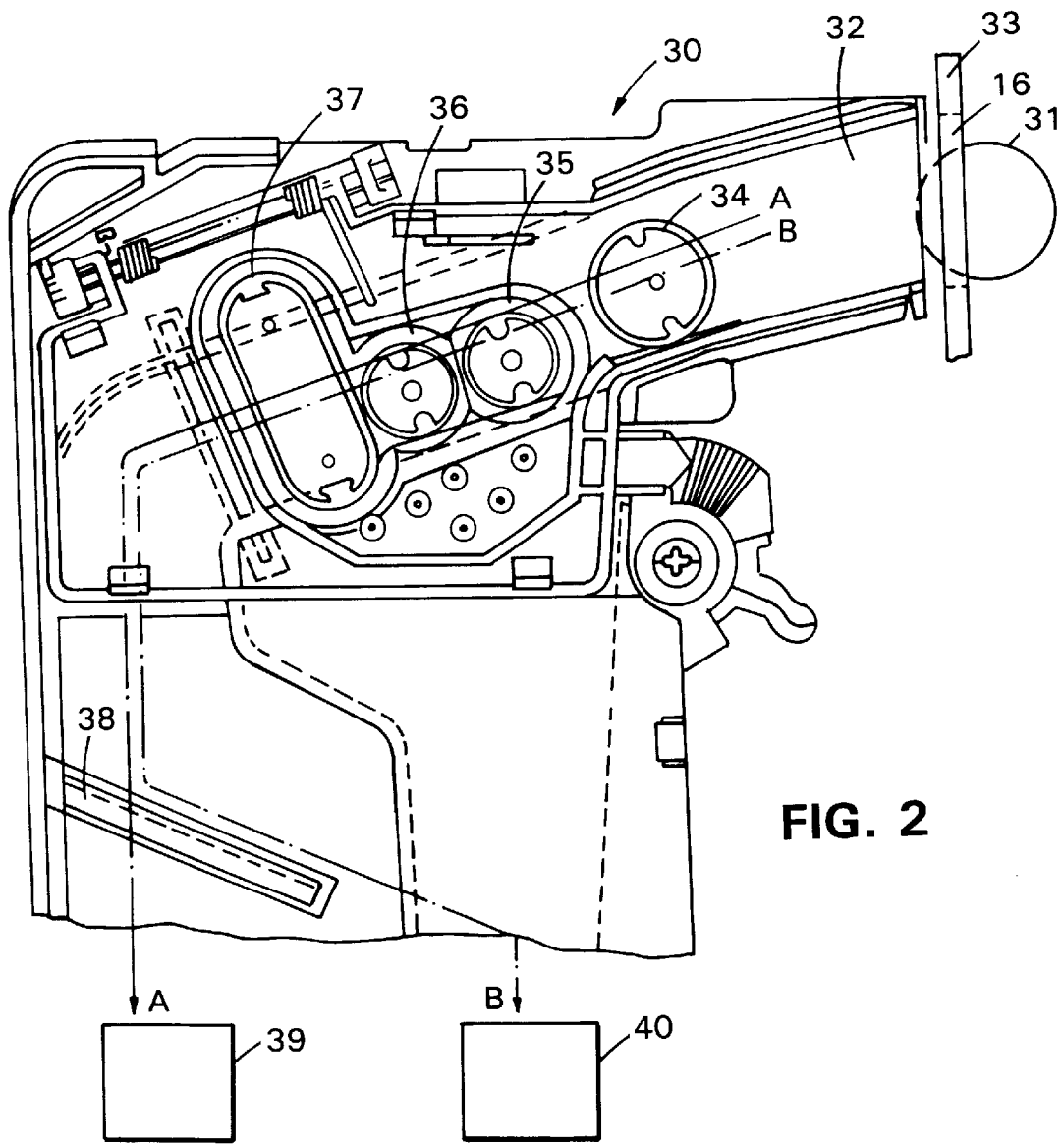
FIG. 2 is a partial cutaway side view of the upper portion of an embodiment of an electronic coin acceptor according to the invention.

FIG. 2 is a partial cutaway side view of the upper portion of an embodiment of an electronic coin acceptor 30. A customer's coin 31 is shown being inserted through coin slot 16 in front panel 33 of the phone 2. From the slot 16, the coin 31 can roll, slide or fall under the influence of gravity as it travels in a coin passageway 32 defined by front and rear walls and coin tracks supported by these walls, past a plurality of coin detectors and sensors 34, 35, 36 and 37. In accordance with the invention, the coin passageway 32 has dimensions capable of accommodating U.S. and Canadian dollar coins, as well as quarters, nickels and dimes. In particular, the Canadian dollar coin has a thickness of approximately 2 millimeters (mm) and a diameter of approximately 27 mm, and the new U.S. dollar coin has a thickness of approximately 2 mm and a diameter of approximately 26.5 mm. Therefore, depending on the market in which the payphone will be used (for example, Canada or the United States), the coin passageway 32 will be of appropriate dimensions to accommodate the coins that will be inserted by customers. Of course, if coins of other denominations and sizes, such as half-dollars or Canadian two-dollar coins, were to be accommodated then the dimensions of the passageway would be sized accordingly so that such coins could be inserted into the payphone.

Referring again to FIG. 2, after passing the last sensor 37, the coin 31 travels downward onto a gate 38 which directs the coin either to a coin escrow bucket 39 or to a return chute 40. The return chute directs a coin to the coin return slot 18 (see FIG. 1) where it can be retrieved by the customer. In traveling from slot 16 to the coin escrow bucket 39 or the coin return chute 40, the coin 31 travels along either an accept path A shown as a solid line in FIG. 2, or along the reject path B shown as a dashed line in FIG. 2.

Each of the sensors 34, 35, 36 and 37 produces an electrical output signal which serves as an input to a processing element or control circuit or microprocessor. Typically, the coin sensors 35, 36, 37 test a variety of a coin's characteristics, such as thickness, material and diameter. The microprocessor uses these signals to determine coin validity and denomination. The microprocessor also produces output signals to control the position of the gate 38 so that the gate either directs the coin along the accept path A or the return path B, and controls a power supply for energizing the gate. Thus, the microprocessor processes the electrical output signals from the sensors 34, 35, 36 and 37, generates gate control signals, and controls the gate power supply. The details concerning coin discrimination and validation functions and microprocessor control of the gate functions are beyond the scope of the present application, but can be found, for example, in U.S. Pat. Nos. 4,842,120 ("Jam Reducing Apparatus For Use In A Coin Operated Machine"), 4,953,681 ("Compact, Low Power Gate Apparatus For Coin Operated Machines"), 4,538,719 ("Electronic Coin Acceptor"), 5,167,313 ("Apparatus for Improved Coin, Bill and Other Currency Acceptance and Slug or Counterfeit Rejection"), 5,330,041 ("Apparatus for Improved Coin, Bill and Other Currency Acceptance and Slug or Counterfeit Rejection"), and 5,443,144 ("Apparatus for Improved Coin, Bill and Other Currency Acceptance and Slug or Counterfeit Rejection"), which are assigned to the assignee of the present invention. Furthermore, additional details of low power control apparatus for a payphone are described in U.S. Pat. Nos. 4,926,458 ("Low Power Control Apparatus For A Coin Operated Telephone"), and 4,979,208 ("Method And Apparatus For Electronic Payphone Open Switch Interval Management"), both assigned to the assignee of the present invention. The disclosures of these U.S. Patents are incorporated by reference herein.

Figure 3:
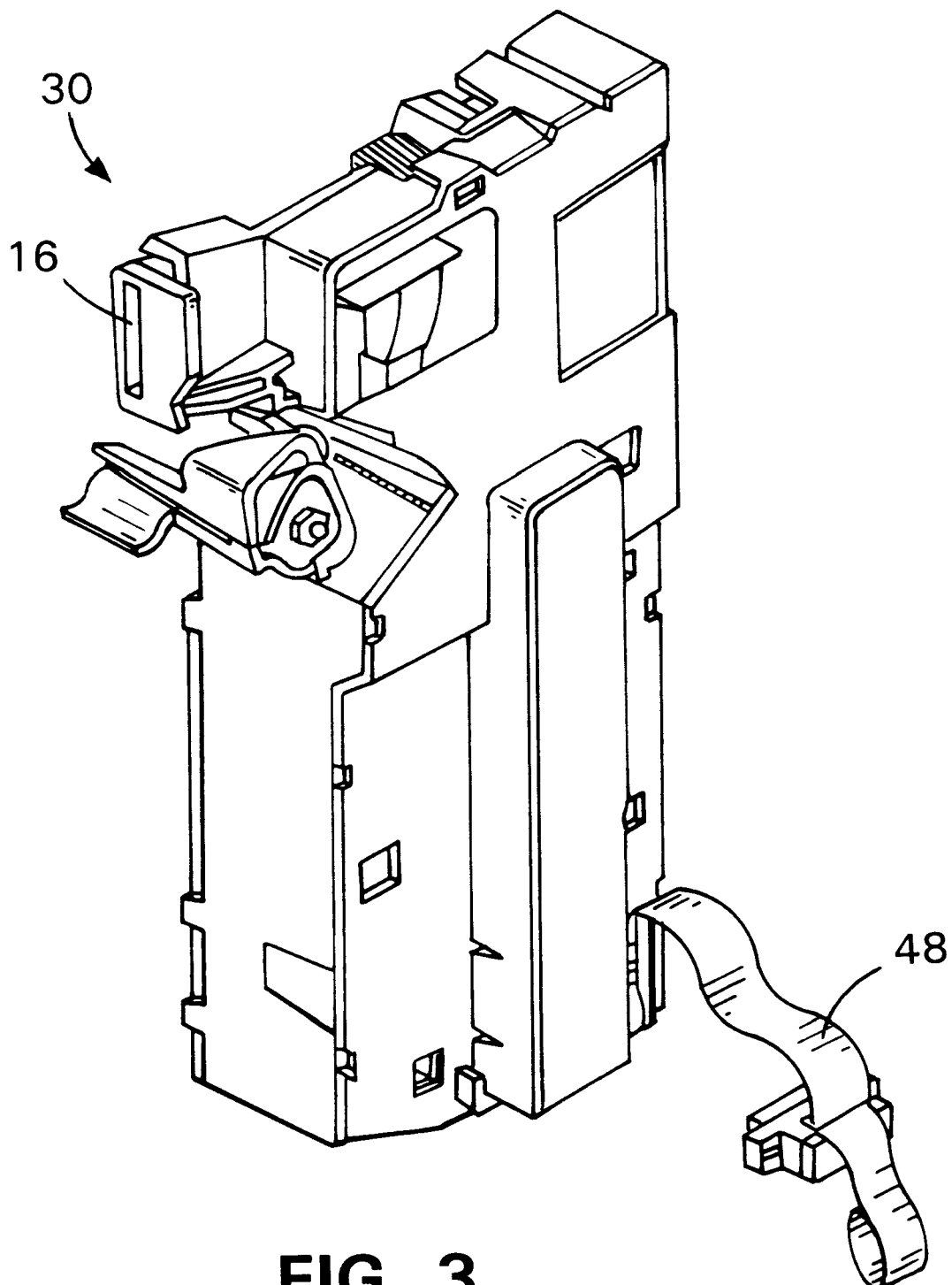
FIG. 3 is a perspective view of the electronic coin acceptor of FIG. 2.

FIG. 3 is a perspective view of an electronic coin acceptor 30 for a payphone. The electronic coin acceptor 30 performs coin validation and denomination functions, and transmits coin credit signals to the payphone chassis. The device 30 may be used as a retrofit to an existing dumb set payphone chassis, for example, the Western-Electric type B-set chassis, or may be used with a Smart-set chassis. The electronic coin acceptor 30 contains a coin slot 16 that leads to the coin passageway 32 shown in FIG. 2 containing the coin sensors. A 14-pin cable 48 is used to connect the electronic coin acceptor 30 to the payphone chassis. The cable 48 supplies power and control signals between the electronic coin acceptor and the payphone chassis, and may be modified to interface with the chassis circuitry of various Dumb or Smart sets.

The electronic coin acceptor 30 is designed to retrofit standard coin operated payphones which accept U.S. (or Canadian) nickel, dime and quarter coins, and to provide the capability to accept coins of denomination higher than twenty-five cents. For example, the coin acceptor is able to accept the U.S. dollar coin that will be minted in 1998, as explained below.

Figure 4:
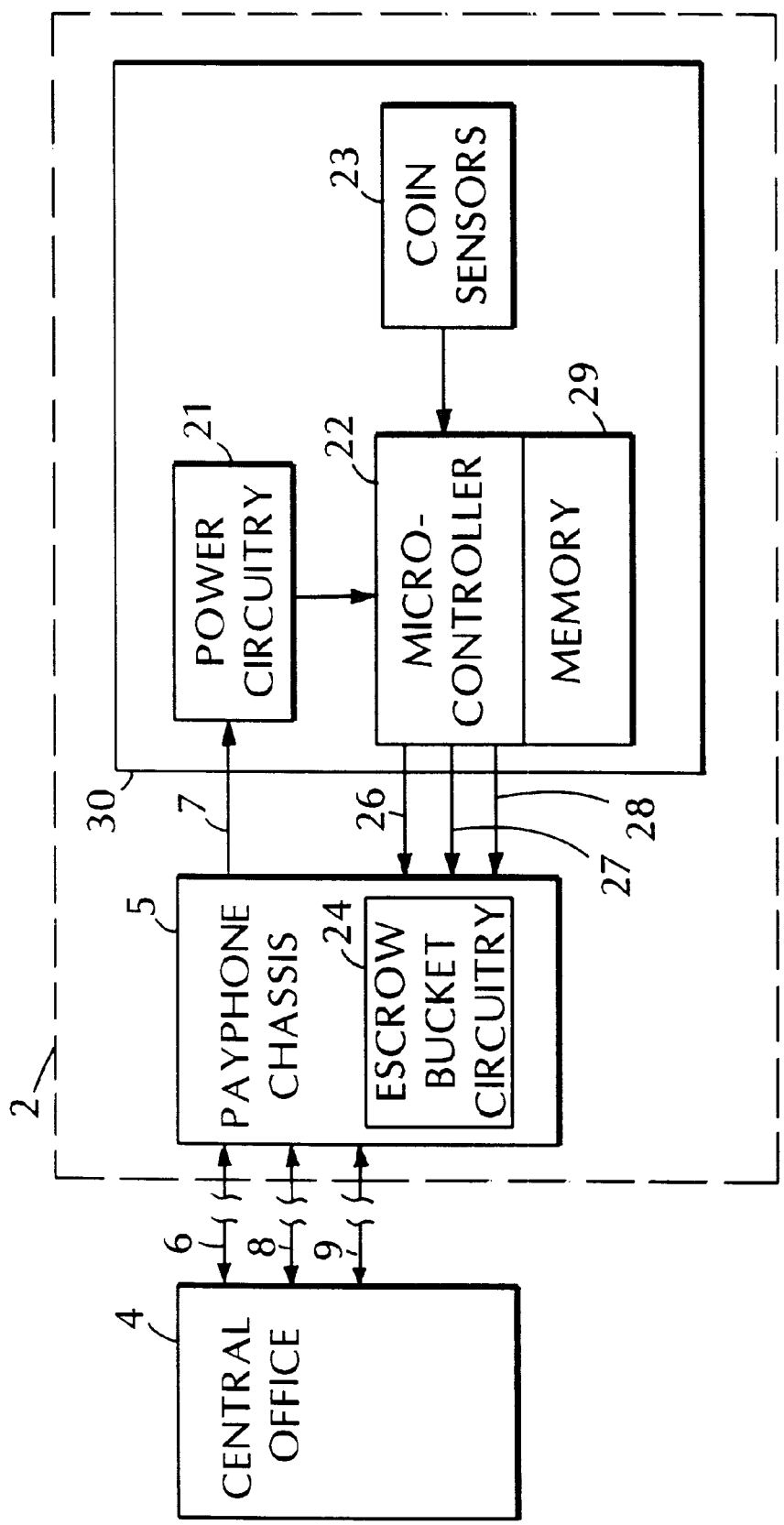
FIG. 4 is a simplified block diagram of the electronic coin acceptor of FIG. 3.

FIG. 4 is a simplified block diagram of a payphone 2, containing an electronic coin acceptor 30 connected to the payphone chassis 5, which is connected to the Central Office 4. The tip 6, ring 8 and ground 9 lines are connected to the payphone chassis 5, and the chassis supplies power on line 7 to the power circuitry 21 of the coin acceptor. The electronic coin acceptor includes a microcontroller 22 having a memory 29. The microcontroller may be a microprocessor or other control circuit having internal or external PR;, ROM, EPROM or other type of memory 29, and is connected to coin sensors 23 (for example, sensors 34, 35, 36 and 37 of FIG. 2). The microcontroller performs at least the following tasks: coin validation and denomination, coin acceptance, chassis interface functions and power management functions. The microcontroller has coin credit output lines 26, 27 and 28 that are connected to the payphone chassis 5. In particular, digital coin credit signals are generated by the microcontroller 22 on a nickel output line 26 when a five cent coin is validated, on a dime output line 27 when a ten cent coin is validated and on a quarter output line 28 when a twenty-five cent coin is validated. These lines are required by the chassis of a Dumb telephone set. The payphone chassis 5 receives these signals and generates a corresponding coin tone signal according to telephone company specifications and transmits it to the Central Office 4 on the tip 6, ring 8 and ground lines 9.

Current BellCore Company specifications require that, when a nickel is validated in payment for a phone call, a single dual-tone multiple-frequency (DTMF) burst of approximately 66 millisecond (ms) duration and at a frequency of approximately 1700 Hertz (Hz) and 2200 Hz be transmitted to the Central Office by the payphone chassis. For a dime, two DTMF tone bursts, each of approximately 66 ms duration with approximately a 66 ms silent period between them, at a frequency of approximately 1700 and 2200 Hz are required by the Central Office. For a quarter, five DTMF tone bursts, each of approximately 33 ms duration with approximately a 33 ms silent period between bursts, and a frequency of approximately 1700 and 2200 Hz is required. (See Bellcore Manual TR-TSY-000961, Mar. 1, 1990). The Central Office connects the call after the correct amount of tones is received indicating that the initial rate charge has been satisfied by insertion of the correct amount of coins, prompts a user for more money when time on the call runs out, and sends a signal back to the payphone to collect the money from the escrow bucket after a call has been completed.

Figure 5A:
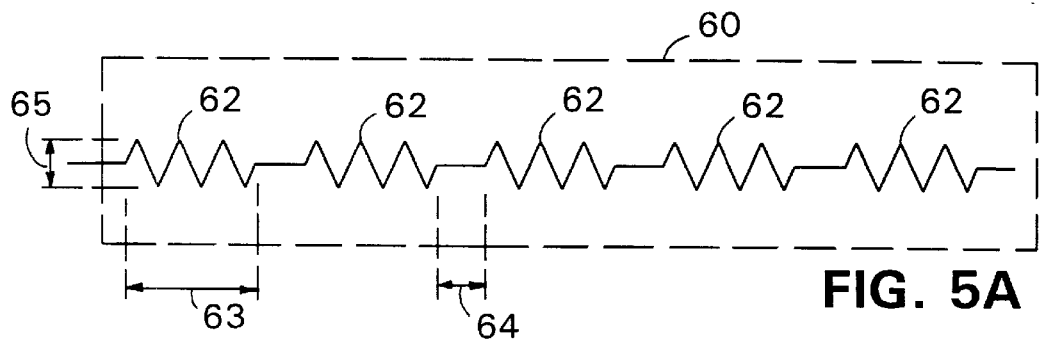
FIG. 5A illustrates a typical sequence of tone burst signals transmitted to the Central Office corresponding to a U.S. quarter coin.

FIG. 5A illustrates a sequence 60 of tone bursts 62 that corresponds to the signal sent to the Central Office by a payphone chassis when a U.S. quarter has been validated. In particular, each of the five tone bursts 62 has a duration 63 of 33 ms±3 ms, and the tone bursts 62 are separated by a quiet period 64 of duration 33 ms±4 ms from one another. Each of the tone bursts 62 has an amplitude 65 of 700 millivolts (mv) to 1.4 Volts (V) peak-to-peak. Payphones currently in use transmit such a sequence of signals 60 to a Central Office to designate that a U.S. quarter (twenty-five cents) has been accepted in payment for a telephone call.

Referring again to FIG. 4, when a customer initiates a call and inserts a cain, the coin sensors 23 generate signals that the microcontroller 22 utilizes to denominate and validate the coin. For example, if a quarter is inserted and validated then the microcontroller sends a digital quarter signal on quarter line 28 to the payphone chassis 5, and the escrow bucket circuitry 24 ensures that the quarter will stay in the escrow bucket until the Central Office 4 signals that it should be collected. Although the coin validator 30 is capable of accepting and validating a coin of value in excess of twenty-five cents, such as a one-dollar coin, the payphone chassis is not capable of sending a one-dollar signal to the Central Office. Thus, when a high value coin, such as a one-dollar coin, is validated and denominated, the microcontroller of the electronic coin validator unit saves that value in memory and controls the signalling to the payphone chassis, as explained below.

Figure 5B:
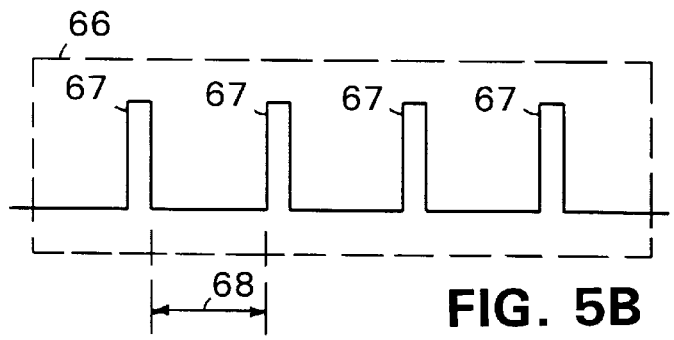
FIG. 5B illustrates a digital one-dollar credit packet signal according to the invention.

FIG. 5B illustrates the example of a one-dollar credit signal packet 66 made of a series of four digital quarter signals 67 which are stored in memory. These four signals are output on quarter line 28 by the microprocessor 22 when a one-dollar coin has been authenticated. The microprocessor also temporarily stores the value of the coin in memory, in lieu of completion of the call. The digital quarter signals 67 are each separated by a quiet duration 68 of approximately 200 ms between them to permit the payphone chassis and the Central Office to accurately process the signals so that a total value of one dollar is recognized by the Central Office. In an embodiment, the microcontroller of the electronic coin acceptor authenticates the high value coin, temporarily stores the value of the coin in memory, accesses the appropriate coin credit signal packet from memory, and outputs that credit signal packet to the payphone chassis. The microcontroller also controls the delay between each signal of the credit digital signals. Alternately, a buffer nay be utilized to control the quiet duration 68 between digital signals, or other delay circuitry could be used to ensure that the correct sequence of digital quarter signals is transmitted.

Figure 5C:
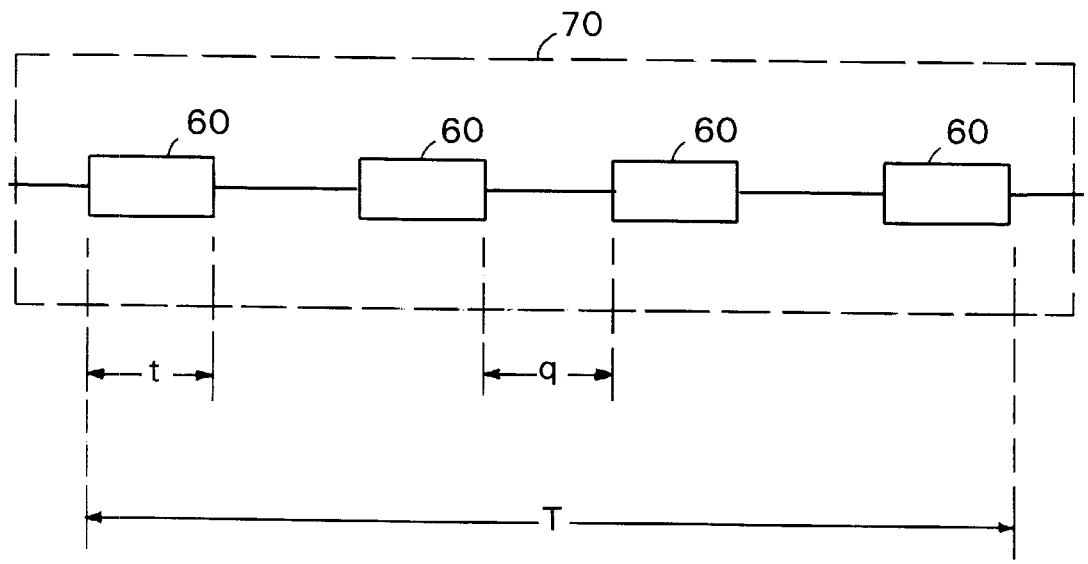
FIG. 5C illustrates the one-dollar signal for transmission to the Central Office resulting from the signal of FIG. 5B.

FIG. 5C illustrates a one-dollar signal packet 70 corresponding to the signals sent to the Central Office by the payphone chassis after receipt of the digital one-dollar credit signal packet 66) of FIG. 5B. Thus, four quarter packets 60 having a duration t of approximately 300 ms±10% with a delay q between each of them of approximately 200 ms are generated. The total time T to transmit the entire signal to the Central Office is approximately 3.3 seconds. Consequently, in return for the convenience of payphone acceptance of one-dollar coins, the customer will experience a delay of several seconds while the DTMF signals are generated and transmitted to the Central Office. During this time, the dollar coin is held in the escrow bucket of the payphone. After the call has been completed, the Central Office sends a signal to the payphone to collect the coin, and then the coin is deposited in the payphone coin box. Such an electronic coin acceptor can be retrofit to an existing payphone and can accept a high denomination coin (a coin in excess of twenty-five cents), without the need to modify the payphone chassis or the existing Central Office infrastructure.

Figure 6A:
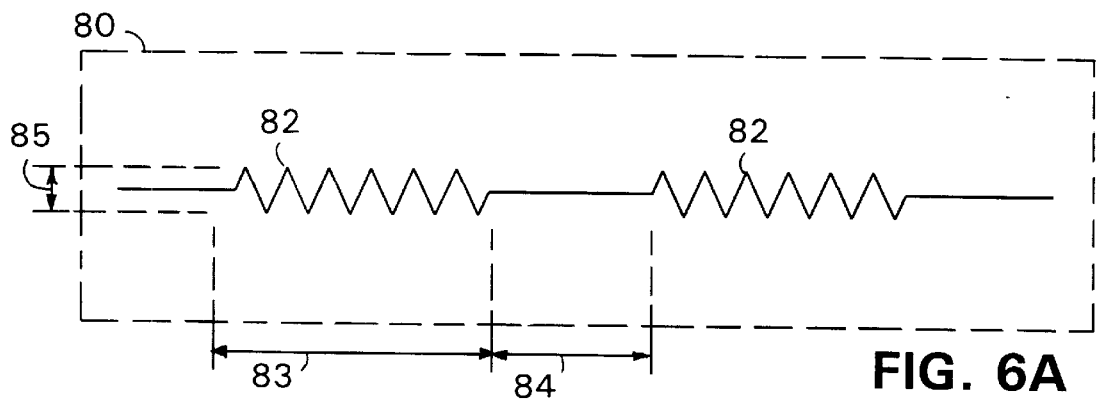
FIG. 6A illustrates a typical sequence of tone burst signals transmitted to the Central Office corresponding to a U.S. dime coin.

FIG. 6A illustrates a sequence 80 of tone burst signals 82 that correspond to the signal sent to a Central Office by a payphone chassis under current BellCore Company specifications after a dime (10 cents) has been accepted by the payphone. In particular, each tone burst 82 has a duration 83 of approximately 66 ms±6 ms, and the tone bursts 82 are separated by a quiet period 84 of duration 66 ms±6 ms. The peak-to-peak voltage 85 of the tone bursts is approximately 700 mv to 1.4 V.

Figure 6B:
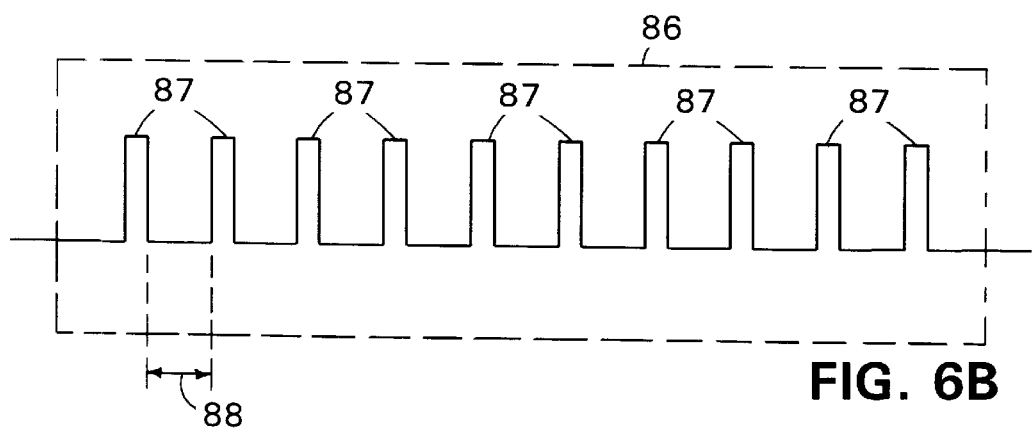
FIG. 6B illustrates an alternate digital one-dollar credit packet signal according to the invention.
Figure 6C:
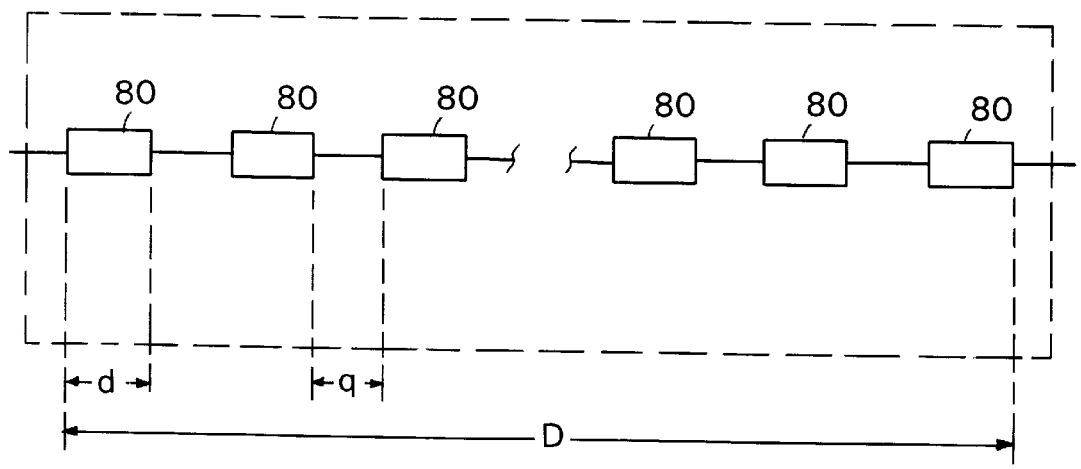
FIG. 6C illustrates the one-dollar signal for transmission to the Central Office resulting from the signal of FIG. 6B.

FIG. 6B illustrates a series of ten digital dime credit signals 87 output on dime line 27 by the microprocessor 22 to form a digital one-dollar credit signal packet 86. This technique is an alternate method from that discussed above with regard to FIG. 5B, wherein the electronic coin acceptor generates a one-dollar credit signal for the payphone chassis. The digital dime signals 87 are separated by a quiet duration 88 of approximately 200 ms. As explained above, the microcontroller, a buffer, or delay circuitry could be used to control the quiet time between the dime signals. FIG. 6C illustrates a one-dollar signal packet 90 transmitted to the Central Office resulting from the one-dollar dime credit signal packet 86. In particular, ten dime signal packets 80 having a duration d of approximately 198 ms±100 with a delay or quiet time Q between them of approximately 200 ms are transmitted to the Central Office. The total time D to transmit the entire dollar packet signal 90 is approximately 3.98 seconds, which is slightly longer than the duration for sending the one-dollar credit signal 70 of FIG. 5C. Of course, instead of signals representing ten dimes, a signal representing twenty nickels could be used; however, the duration of the signal sent to the Central Office would then increase to approximately 5.32 seconds. Alternately, it is possible to produce coin credit signal packets of a combination of nickels, dimes and quarters for the payphone chassis which, when added together, indicate that a high value coin, such as a one-dollar coin, has been validated. However, such a technique would involve complex processing and timing schemes.

Figure 7:
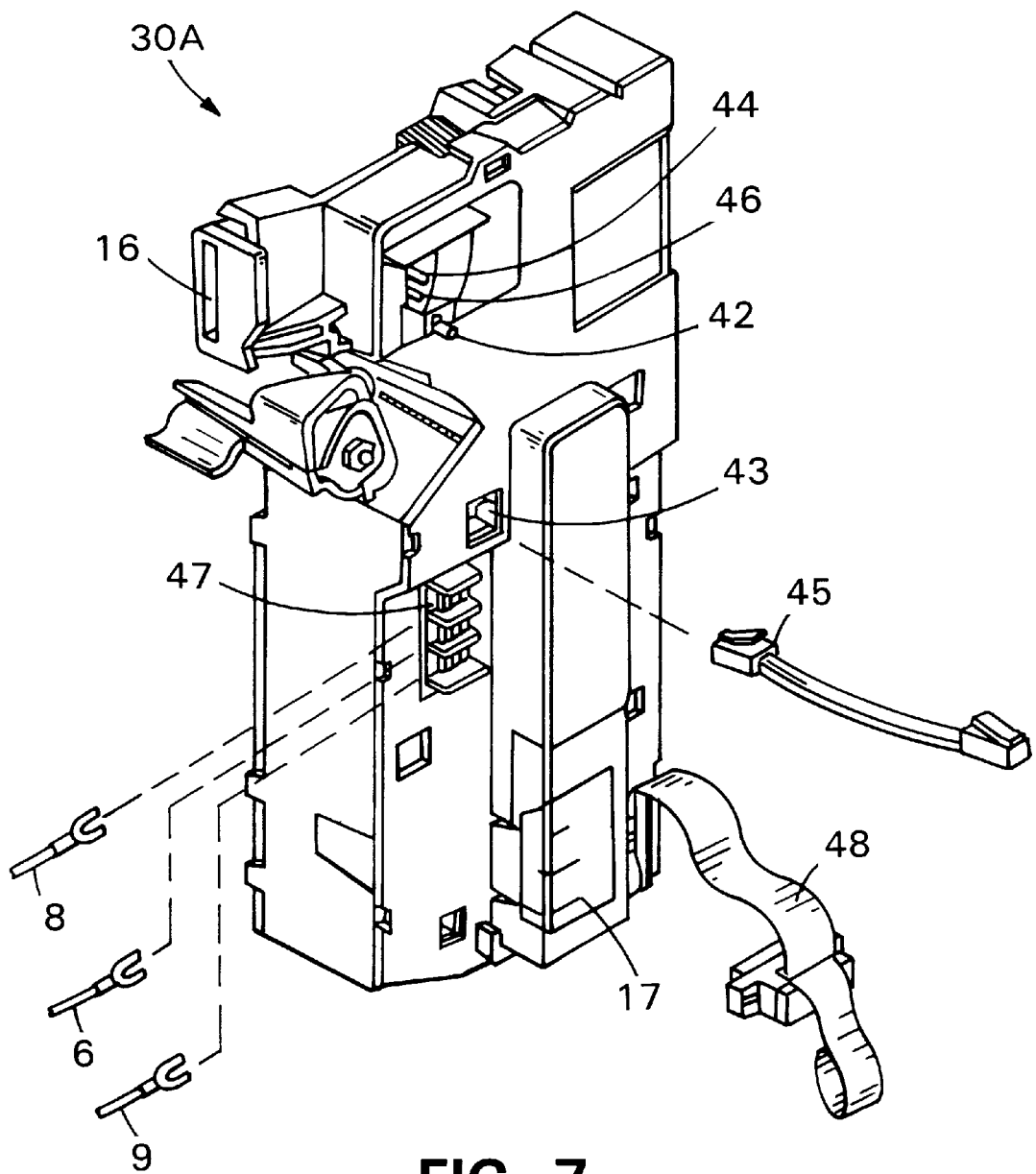
FIG. 7 is a perspective view of an alternate embodiment of an electronic coin acceptor according to the invention.

FIG. 7 is a perspective view of an alternate embodiment of an electronic coin acceptor 30A. The coin acceptor 30A is an integrated, stand-alone unit that is capable of performing both coin validation and audit operations, including transmitting audit data to a Central Office. The device 30A may be installed as original equipment in a payphone, or may be used as a retrofit to either an existing Dumb or Smart set payphone chassis.

Referring to FIG. 7, the integrated coin acceptor 30A contains a coin slot 16 leading to a coin passageway that contains the coin sensors (see FIG. 2). The exterior of the housing 41 includes a test button 42 and two LED's 44, 46 which are used to initialize audit functions and the like. A battery cover 17 protects access to a replaceable battery (not shown), which may be a high-density, long-life battery preferably having at least a 5-year life, for powering certain functions when phone line power is unavailable. Connectors 47 accept the tip 6, ring 8 and ground 9 lines of a coin line. A pig-tail male plug 45 is shown for connection to female connector 43, and is used for connecting the tip, ring and ground lines from the integrated coin acceptor 30A to the payphone chassis (not shown). In addition, a 14-pin cable 48 is used to connect the integrated coin acceptor to the payphone chassis. The cable 48 supplies power and control signals between the payphone chassis and the integrated coin acceptor, and may be modified to interface with the circuitry in the chassis of various Dumb or Smart sets.

When the integrated coin acceptor 30A is retrofit into an existing payphone with a dumb chassis, the tip 6, ring 8 and ground 9 lines are connected directly to the connector 47 and an installer uses test button 42 to initialize and test various functions. Details concerning the audit and other functions of the integrated coin acceptor 30A are beyond the scope of this application, but can be found in U.S. application Ser. No. 08/681,844, filed on Jul. 29, 1996 which is assigned to the assignee of the present application and which is incorporated by reference in its entirety herein.

Figure 8:
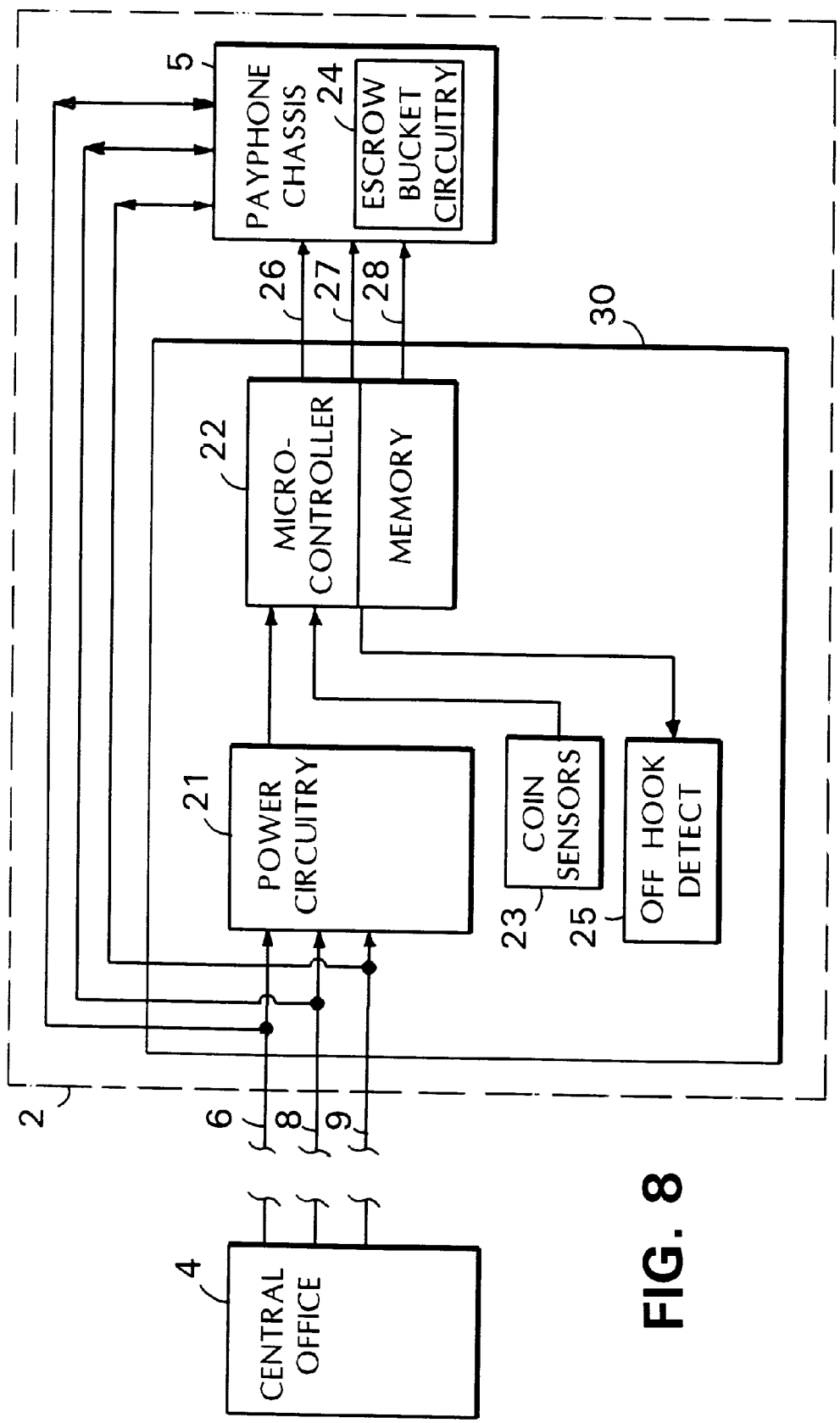
FIG. 8 is a simplified block diagram of the coin acceptor of FIG. 7.

FIG. 8 is a simplified block diagram of a payphone 2, containing the integrated coin acceptor 30A connected to a Central Office 4 and a payphone chassis 5. Power circuitry 21 is connected to the tip 6, ring 8 and ground 9 lines, and to a microcontroller 22 having a memory 29. The microcontroller 22 may be a microprocessor having internal or external RAM, ROM, EPROM, EEPROM or other memory, and is connected to the coin sensors 23 (for example, sensors 34, 35, 36 and 37 of FIG. 2), and to an off-hook detect circuit 25. The microcontroller may be connected to other circuitry, and performs at least the following tasks: coin validation and denomination, coin acceptance, audit functions, chassis interface functions and power management functions. The microcontroller is also connected to the payphone chassis 5 by a nickel line 26, a dime line 27 and a quarter line 28 which are used to signal acceptance (validation and denomination) of the corresponding coinage by the integrated coin acceptor 30A to the payphone chassis 5 when a call is placed by a customer. The payphone chassis contains circuitry (not shown) for generating the appropriate coin tone signals required by the Central Office 4 to connect the call. The integrated coin acceptor 30A may be programmed to accept; coins of value in excess of twenty-five cents, for example one-dollar coins, in the same manner described above with respect to the electronic coin acceptor 30 of FIG. 3. In particular, the same dollar-packet digital coin credit signals (as, shown in the examples of FIGS. 5B and 6B) are generated and output to the payphone chassis so that the proper coin value signals can be transmitted to the Central Office.

A number of embodiments of the present invention have been described. Nevertheless, it will be understood that various modifications may be made without departing from the spirit and scope of the invention. For example, while examples of the technique discuss how to generate signals for a U.S. dollar coin, one of skill in the art would be able to use the technique disclosed with respect to other high value coins such as fifty-cent coins and/or two-dollar coins of U.S. or other country coin sets. Accordingly, other embodiments are within the scope of the following claims.

What is claimed is:

1. An electronic coin validator unit for connection to a payphone chassis, the electronic coin validator capable of accepting high value coins of value greater than twenty-five cents, comprising:

a housing;

a coin passageway within the housing;

at least one coin sensor in the coin passageway;

nickel, dime and quarter output signal lines for connection to the payphone chassis;

a memory; and a control means connected to the sensor, to the memory, and to the output signal lines, the control means processing signals from the sensor to validate and denominate a high value coin, accessing a credit signal packet corresponding to the denomination of the high value coin from the memory, and outputting the credit signal packet on the output signal lines.

2. The coin validator of claim 1, further comprising a buffer to provide a delay between signals of the credit signal packet.

3. The coin validator of claim 1, wherein the control means temporarily stores the value of the coin in memory in lieu of the completion of the call.

4. The coin validator of claim 1, wherein the coin passageway has dimensions to permit coins having a diameter larger than a U.S. quarter to pass therethrough.

5. A method in a payphone coin acceptor for accepting high value coins of denominations greater than twenty-five cents, comprising:

authenticating the high value coin;

temporarily storing the value of the coin in a memory;

accessing a coin credit signal packet of signals from the memory that corresponds to the value of the coin; and releasing the credit signal packet to the payphone chassis by choosing at least one coin credit output line, determining the number of coin credit signals to transmit on a chosen line, and imposing a delay between each coin credit signal.

6. The method of claim 5, wherein the coin credit signal packet contains a sequence of signals corresponding to a plurality of twenty-five cent coins.

7. The method of claim 5, wherein the coin credit signal packet contains a sequence of signals corresponding to a plurality of ten-cent coins.

8. The method of claim 5, wherein the coin credit signal packet contains a sequence of signals corresponding to a plurality of five-cent coins.

9. The method of claim 5, wherein the coin credit signal packet contains a combination of signals that corresponds to at least two of a plurality of five, ten and twenty-five cent coins.

* * * * *

UNITED STATES PATENT AND TRADEMARK OFFICE
CERTIFICATE OF CORRECTION

PATENT NO.    : 5,988,347
DATED         : November 23, 1999
INVENTOR(S)   : David M. Schwab It is certified that error appears in the above-identified patent and that said Letters Patent is hereby corrected as shown below:

Column 2,
Line 28, delete semicolon after "packet".

Column 5,
Line 10, change "PR;" to -- RAM --.
Line 60, change "cain" to -- coin --.

Column 6,
Line 26, change "nay" to -- may --.
Line 33, remove parenthesis after "66".

Column 7,
Line 5, change "100" to -- 10% --.

Column 8,
Line 13, remove semicolon after "accept".
Line 17, remove comma after "as".

Signed and Sealed this

Twenty-first Day of October, 2003

JAMES E. ROGAN
*Director of the United States Patent and Trademark Office*